United States Patent [19]

Haws et al.

[11] Patent Number: 4,750,365
[45] Date of Patent: Jun. 14, 1988

[54] PLATFORM MOTION MEASURING SYSTEM

[75] Inventors: Joe H. Haws, Richmond; Thomas E. Long, Montgomery; Maurice M. Patterson, Houston, all of Tex.

[73] Assignee: Shell Oil Company, Houston, Tex.

[21] Appl. No.: 829,358

[22] Filed: Feb. 14, 1986

[51] Int. Cl.⁴ ............................................. G01M 7/00
[52] U.S. Cl. .................................. 73/594; 73/493; 73/786
[58] Field of Search ................. 73/493, 579, 594, 654, 73/786, 652, 517 R; 33/333, 366

[56] References Cited

U.S. PATENT DOCUMENTS

| | | | |
|---|---|---|---|
| 2,552,722 | 5/1951 | King | 73/516 R |
| 3,010,214 | 11/1961 | Postlewaite | 33/366 |
| 4,000,658 | 1/1977 | Schmidt | 73/493 |
| 4,300,220 | 11/1981 | Goff et al. | 73/654 |
| 4,343,186 | 8/1982 | Schnapp | 73/493 |
| 4,561,299 | 12/1985 | Orlando et al. | 33/366 |

OTHER PUBLICATIONS

"Flexibility Monitoring of Offshore Jacket Platforms," a paper by S. Rubin and R. N. Coppolino (OTC 4535), presented at the 15th OTC in Houston, Tex., May 1983.
"A System for Acquiring Earthquake Data on Offshore Oil Platforms," a paper by R. Husid, J. H. Haws, and M. M. Patterson, *Eighth World Conference on Earthquake Engineering*, vol. 6, pp. 55–62, San Francisco, Calif., 1984.

*Primary Examiner*—John Chapman

[57] ABSTRACT

A method and apparatus for measuring the motion of tall structures, particularly offshore platforms. The method comprises disposing a number of accelerometer packages in a tubular member attached to a vertical or near vertical member of the structure. Each package contains three accelerometers having their axes dipsosed in an orthogonal arrangement. The apparatus includes means for installing and removing a plurality of packages from tubular members or chutes that are permanently attached to the structure.

7 Claims, 3 Drawing Sheets

FIG.1
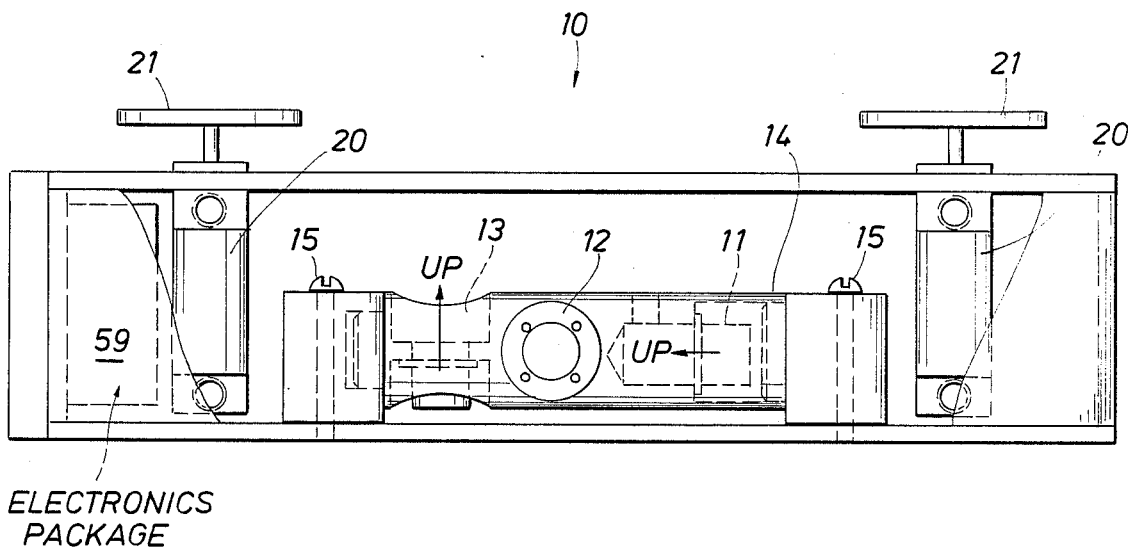
ELECTRONICS
PACKAGE
FIG.2
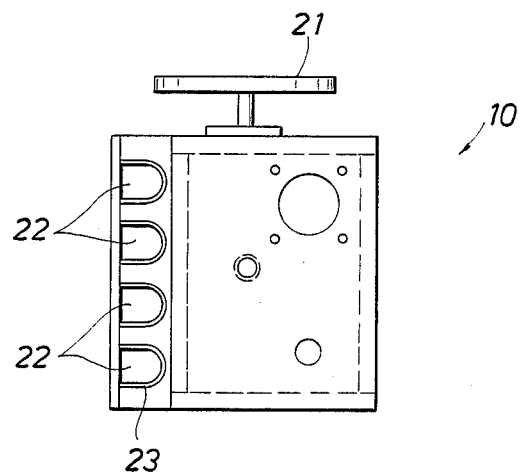
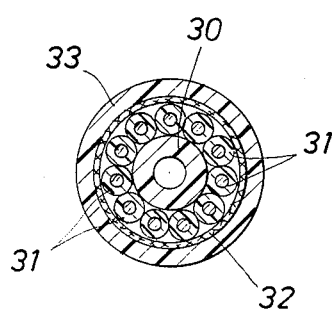
FIG.3

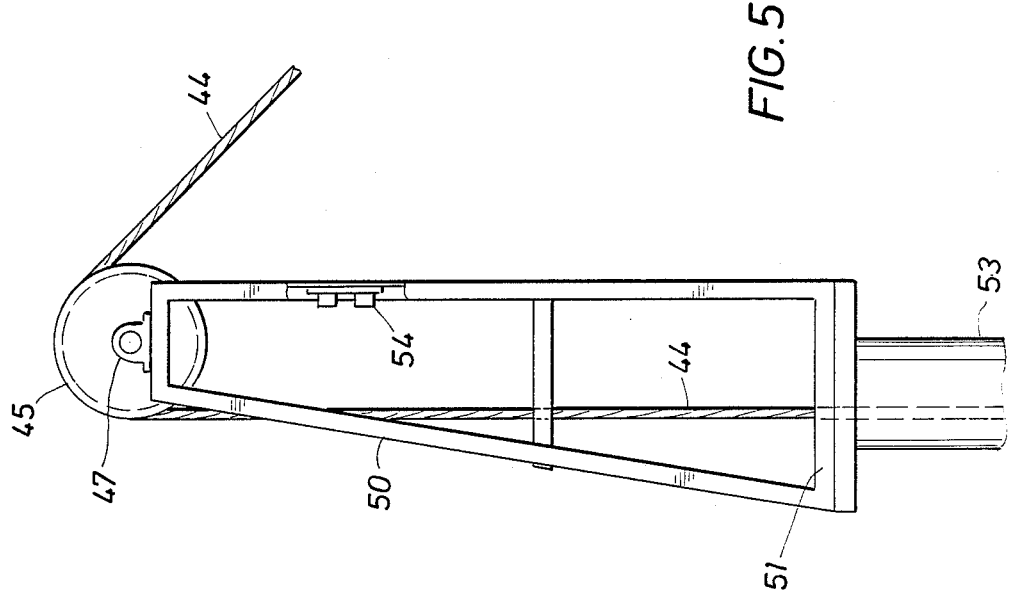
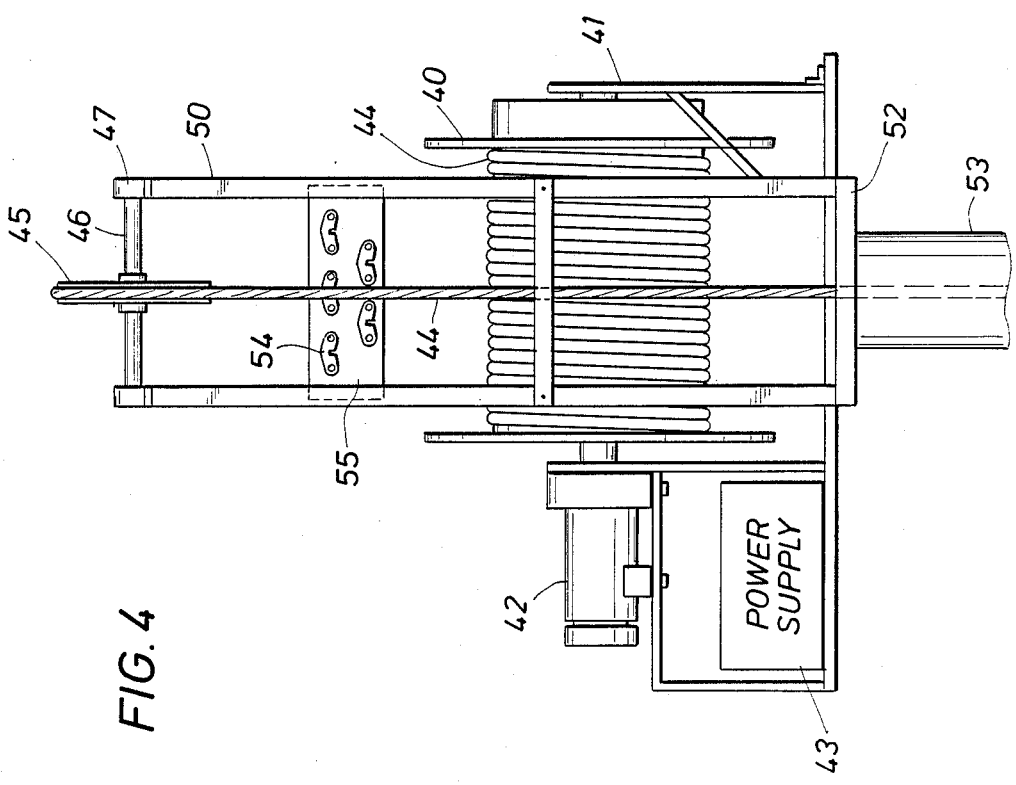

PLATFORM MOTION MEASURING SYSTEM

BACKGROUND OF THE INVENTION

The present invention relates to an apparatus and method for measuring the movement of a tall structure, particularly an offshore platform used for the production of hydrocarbons in water covered areas. Offshore platforms installed in some producing areas of the world are subject to extraordinary forces that are not present in other areas of the world. For example, platforms installed in the Cook Inlet of Alaska or offshore on the North Slope of Alaska are subject to large forces caused by the breakup of the ice each year. Also, platforms installed offshore California are subject to earthquakes which cause severe movements of the platform. Further, as the water depths in which petroleum operations are conducted increase, the height of the platform in relation to its overall cross sectional area becomes greater and the platform is subject to greater movement.

In order to confirm the design of offshore structures, attempts have been made using accelerometers to measure the movement of the platforms. The accelerometers measure the motion of the platform and these measurements can be used in determining whether the platform motion and the resulting stress is within the assumptions made during the design of the platform. While accelerometers have been used to measure platform movements, they are normally fixed to the above-water portion of the platform and only reflect the movement of that portion of the platform. Attempts have been made to place accelerometers on the supporting legs of platforms, either by permanently fastening the accelerometer package to the platform legs or lowering them into suitable tubular structures which have been affixed to the platform legs. While these systems have been successful in obtaining data relating to the movement of the platform, they do not present data taken on all the various legs of the platform simultaneously. It is desirable to make all measurements at the same time so that the natural frequency and mode shapes of the platforms can be calculated. While the use of accelerometer packages fastened to the legs of the platform are useful, they are unreliable due to the nature of the accelerometers and the inability to retrieve the package to effect repairs. Also, accelerometer packages that have been lowered into tubular members affixed to the legs of the platform provide measurements at only one position on the leg and not multiple positions which would be desirable.

SUMMARY OF THE INVENTION

The present invention solves the foregoing problems by providing an accelerometer package including three accelerometers having their sensitive axis arranged orthogonally that can be lowered into tubular members attached to the legs of a platform. The package is designed so that multiple packages may be positioned in the tubular member or chute at the same time and thus measure the motion of the leg of the platform at several positions in response to the same external force. The package is lowered into the chute using a special cable which, in addition to containing the required electrical conductors, also contains a strength member for supporting the package and a pneumatic tube for supplying compressed air to the package for actuating the clamping means that holds the package in position. The package is so designed that cables from packages that are positioned below the uppermost package may pass through the uppermost package and allow installation of the multiple packages.

The surface equipment for handling the packages is designed for portability and easy positioning over the chutes attached to the platform legs. In addition, the equipment includes means for lowering and raising the packages and securing the various cables in position once the packages have been lowered to their desired depths. This allows additional packages to be lowered into the chute. The portability of the equipment allows it to be moved from leg to leg on the platform, or from platform to platform. This, of course, reduces the overall cost of the measuring equipment since it is not necessary to permanently affix any accelerometers to the platform.

The signals from the accelerometers are amplified in the package and then transmitted to the surface where they are processed. The surface processing equipment includes both means for adjusting the amplitude of the signals to reflect the difference between the actual axes of the accelerometers and the earth's orthogonal axes. The signal from the vertical axis accelerometer is also adjusted to cancel the effect of gravity on this accelerometer. The signals are then filtered to remove both the higher frequencies and the DC components after which they are amplified and supplied to suitable recording equipment. Since it is possible to correct for the misalignment of the axes of the accelerometers, the accelerometer package can be used at any position on the platform or on any leg of the platform regardless of the inclination of the particular platform member with respect to vertical. This ensures that the accelerometer package and recording equipment can be used on various platforms, and on various members on a single platform. Thus, the cost of the measuring system is further reduced.

BRIEF DESCRIPTION OF THE DRAWINGS

The invention will be more easily understood from the following detailed description when taken in conjunction with the attached drawings in which:

FIG. 1 is a longitudinal view of the accelerometer package shown partially in section.

FIG. 2 is an end view of the accelerometer package shown in FIG. 1.

FIG. 3 is a cross sectional view of the cable used with the accelerometer package.

FIG. 4 is front view of the portable equipment used for raising and lowering the accelerometer package in the chute.

FIG. 5 is a side view of the equipment shown in FIG. 4.

DESCRIPTION OF PREFERRED EMBODIMENTS

Figure 6:
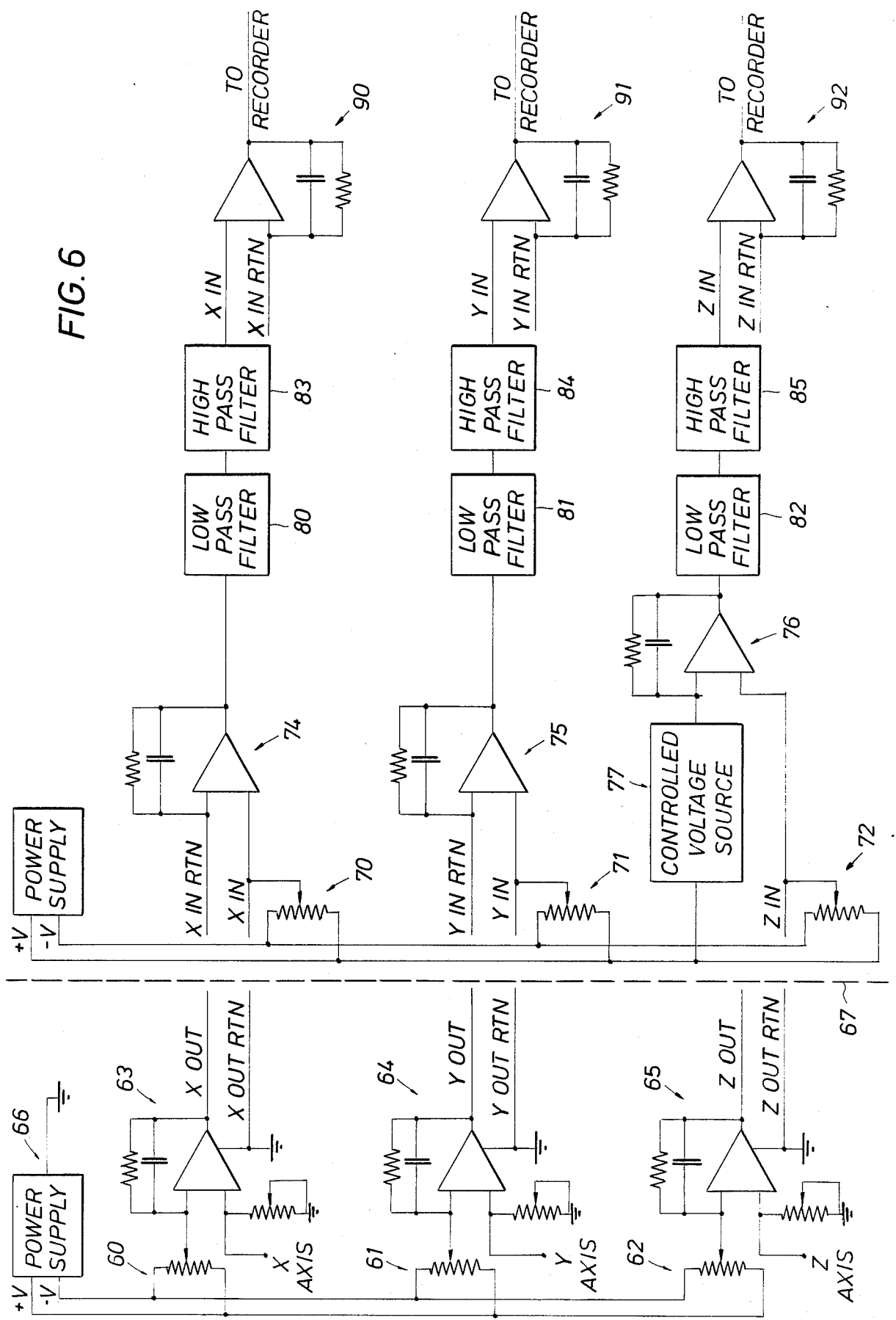
FIG. 6 is a block diagram of the circuit used for assessing the signals from the accelerometer.

Referring to FIGS. 1 and 2, there is shown the side and end views of the accelerometer package 10 of the present invention. The accelerometer package is disposed in a case, preferably constructed from suitable high strength plastic materials. For example, the housing may be formed of a polycarbonate plastic which is sold under the trade name "Lexan" by General Electric Company. This material has the ability to deform without breaking and has high mechanical strength. The use of a plastic is preferred since it a non-corrosive material that is capable of transmitting the platform motion to the accelerometers but due to its unique characteristics, will not reverberate as more rigid materials such as steel or similar metals. Additionally, this eliminates any corrosion problems due to the "battery effect". The three accelerometers, 11, 12 and 13, are positioned in a suitable mount 14 with their axes arranged in an orthogonal arrangement. The direction of the sensitive axes for the accelerometers 11 and 12 are shown and indicated by the notation "up". The accelerometer mount 14 is preferably formed of the same material as the housing of the package and is secured to the housing by suitable fastening means 15. The package is provided with two pneumatic cylinders 20 which are disposed at opposite ends of the package. Suitable pads 21 are affixed to the pistons of the cylinders and when the cylinders are extended, firmly anchor the package in the chute attached to the platform leg. It is preferable that the chute have a rectangular cross section that is attached to the platform in a known orientation. This simplifies anchoring of the accelerometer package in the chute and the alignment of the package. The pneumatic cylinders 20 are preferably single acting cylinders which can be extended with the application of compressed air to anchor the package and are spring-retracted when the compressed air is vented. The inverse of this procedure is true for use with a more permanent attachment. This permits the pads to be retracted as the package is installed in the chute and then anchoring the package at the desired elevation in the chute.

The accelerometer package is provided on one of its longitudinal sides with a series of U-shaped channels 22. The channels receive the cables of the accelerometer units which are disposed below the uppermost accelerometer. As shown in FIG. 2, provisions are made for installing four packages below the uppermost unit. The individual U-shaped channels are lined with a suitable solid lubricating material, for example, polytetrafluoride, which is sold under the trade name "Teflon". This ensures that the accelerometer packages can be easily positioned in the chute and that the packages will pass freely over the cables that extend to the lower position packages.

Referring now to FIG. 3, there is shown a cross sectional area of the cable used with the accelerometer package of FIGS. 1 and 2. The cable includes a central tubular member 30 which is preferably a plastic or flexible hose for transmitting the pneumatic pressure to the package for actuating the cylinders 20. Surrounding the cable are eleven individual electrical conductors 31 that provide the necessary circuits for transmitting power to the unit and for transmitting signals from the three accelerometers to the surface. Surrounding the electrical cables is a tubular strength member 32 which is formed of suitable plastic material, for example, a woven sleeve formed of "Kevlar" which is sold by DuPont Chemical Company of Wilmington, Del. The complete cable is covered with a protective plastic sleeve 33.

Referring now to FIGS. 4 and 5, there is shown the winch and mast structure used for raising and lowering the accelerometer packages in the chute 53 attached to the offshore structure. The mast 50 is formed of suitable structural materials and is provided with a base 51 which mounts on a flange 52 provided at the top of the chute 53. The winch is provided with a drum 40 which is mounted for rotation in the support means 41. The drum 40 is made removable so that after the first accelerometer package is installed the cable may be secured and the drum removed from the winch. A second drum and accelerometer package may then be positioned for installation in the borehole. The winch is driven by motor means 42 which may be powered from a power supply 43 comprising a conventional storage battery or the like. The cable 44 as shown in FIG. 3 is wound on the winch drum 40 and passes upwardly over a sheave 45 mounted on a shaft 46 at the top of the mast structure 50. The shaft 46 is journaled in suitable bearings 47. The cable passes down through the base of the mast structure and into the chute to lower the accelerometer package to the desired level. After the package is lowered to the desired level, the cable 44 is secured in one of the plurality of cam cleats 54 that are mounted on a plate 55 attached to the mast structure. The cam cleats 54 are well known items that are sold in most marine stores. Once the cable is secured in the cam cleat the winch drum 40 may be removed and placed aside and a second drum installed and the cable and accelerometer package fed over the sheave 45 and down into the chute 53. In this manner numerous accelerometer packages may be installed in a single chute. Of course, the lowermost package must be installed first and then the succeeding ones installed at succeedingly shallow levels.

Referring now to FIG. 6, there is shown a block diagram of the circuits used in the present invention. In particular, there is shown three amplifiers, 60, 61 and 62, which are mounted in the downhole electronics package 59 and used to amplify and condition the signals from the X, Y and Z axis accelerometers. Each of the amplifiers is provided with a gain adjusting means 63, 64 and 65, respectively, with the gain adjusting means being powered from a power supply 66. The power supply is coupled to a surface power source by means of conductors in the cable shown in FIG. 3 and not shown in FIG. 6. The gain adjusting means permits the adjustment of the accelerometer output level to the desired volts per magnitude of gravity. In particular, this dynamic range can be adjusted to provide the same output level between 0.005 gravity to 0.300 gravity. Each of the amplifiers is also provided with a conventional resistance capacitance type feedback circuit as shown. The output from the X axis amplifier is indicated as being X-out, and X-out rtn, which is the ground return lead with similar outputs being provided for the Y and the Z axis accelerometers. The downhole electronics are separated from the uphole electronics by the dotted line 67 shown in the Figure, the electronics to the right of the dotted line being located at the surface.

Each of the accelerometers is connected to a second operational amplifier 70, 71 and 72, respectively, located at the surface. Each of the amplifiers are provided with an offset control circuit illustrated at 74, 75 and 76, respectively. These gain control circuits allow the signal from each accelerometer to be adjusted for the difference between the actual accelerometer axis and its desired axis. Most of the legs on platforms are not vertical but are sloped outwardly from the platform deck so that the base of the platform is much larger than the deck located above the surface of the water. Thus, the axis of the chute attached to the platform leg will not be vertical and the accelerometer axes will not lie exactly in the orthogonal axis. In addition to these adjustments, a precision control voltage source 77 is provided in the input to the amplifier 72 and is used to compensate for the one gravity force applied to the Z axis accelerometer that results from the vertical mounting of the accelerometer. The output of the three amplifiers are passed to low pass filters 80, 81 and 82 that have adjustable cutoff frequencies. For example, the cutoff frequencies may be between 0.05 Hz and 51.15 Hz. The low pass filter should have some means for adjusting the upper cutoff frequency to vary the response of the systems for various platforms and applications. Obviously, taller platforms such as those mounted in very deep waters will have a different frequency response than platforms mounted in more shallow waters. The low pass filters are connected to high pass filters 83, 84 and 85, respectively, and are designed to remove any DC component (<0.02 Hz) from the accelerometer signals. Signals from the high pass filters are passed to an additional three amplifiers 90, 91 and 92, which serve to match the impedance of the input signals to the recorder used for recording the signals. While no recorder is shown, the signals may be recorded on conventional chart recorders so that they can be visually displayed or recorded on multiple channel FM recorders. In addition, if desired, the signals could be passed to an analog-to-digital converter and then recorded digitally on magnetic tape or computer mass storage system. This would preserve the exact characteristics of the various accelerometer signals and they could then be analyzed using suitable computer programs.

What is claimed is:

1. An apparatus for measuring the movement of a tall structure comprising:
   a tubular member permanently attached to a portion of the structure with its longitudinal axis extruding in an upwardly direction;
   a plurality of accelerometer packages, each of said packages containing at least three accelerometers, said accelerometers being mounted in their respective package with their axes arranged orthogonally;
   a plurality of cable means connected to each of said accelerometer packages for lowering said packages into said tubular member and positioning said packages at predetermined levels in said tubular member;
   a plurality of anchor means, each of said cable means being secured in one of said anchor means to maintain said packages at said predetermined levels in said tubular member; and
   a circuit being coupled to each of said cable means, the circuit including means for recording signals from said accelerometers.

2. The apparatus of claim 1 and in addition winch means, said cable means being secured to said winch means whereby said cable means may be reeled and unreeled to raise and lower said package.

3. The apparatus of claim 2 wherein each package is supplied with an individual cable and winch means.

4. The apparatus of claim 3 and in addition a drive means disposed to drive said winch means.

5. The apparatus of claim 4 wherein said winch means are removable from said drive means after the cable means is secured to the anchor means.

6. An accelerometer package for use in measuring the movement of a structure, said package comprising:
   an enlongated housing, with cable means for raising and lowering said housing in an elongated tubular member, said housing having a square cross section.
   accelerometer mounting means, said mounting means being secured to the interior of said housing;
   a plurality of accelerometers, said accelerometers being disposed in said accelerometer mounting means with their axes disposed orthogonally; and
   cable passage means formed on a portion of a long surface of said housing for passage of said cable means, said cable passage means comprising a series of channels formed on one side of said housing and having a U-shaped cross section.

7. The package of claim 6 wherein said channels are lined with a solid lubricating material.

* * * * *